US010882193B2

(12) United States Patent
Inoue et al.

(10) Patent No.: US 10,882,193 B2
(45) Date of Patent: Jan. 5, 2021

(54) ROBOT STRUCTURE

(71) Applicant: FANUC CORPORATION, Yamanashi (JP)

(72) Inventors: Toshihiko Inoue, Yamanashi (JP); Tomoyuki Motokado, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/181,606

(22) Filed: Nov. 6, 2018

(65) Prior Publication Data
US 2019/0160694 A1 May 30, 2019

(30) Foreign Application Priority Data
Nov. 24, 2017 (JP) ................. 2017-226006

(51) Int. Cl.
B25J 9/10 (2006.01)
B25J 17/02 (2006.01)
(Continued)

(52) U.S. Cl.
CPC .......... *B25J 17/0241* (2013.01); *B25J 9/102* (2013.01); *B25J 18/00* (2013.01); *F16H 1/145* (2013.01)

(58) Field of Classification Search
CPC .................................................. B25J 19/0029
See application file for complete search history.

(56) References Cited

U.S. PATENT DOCUMENTS 4,642,021 A * 2/1987 Kikuchi ................. B25J 9/102
414/735
4,840,090 A * 6/1989 Iwata ................. B25J 19/0029
74/640

(Continued)

FOREIGN PATENT DOCUMENTS

CN 1880798 A 12/2006
CN 107263458 A 10/2017
(Continued)

OTHER PUBLICATIONS

Office Action dated Oct. 1, 2019, in corresponding Japanese Application No. 2017-226006; 11 pages.
(Continued)

*Primary Examiner* — William Kelleher
*Assistant Examiner* — Gregory T Prather
(74) *Attorney, Agent, or Firm* — Maier & Maier, PLLC

(57) ABSTRACT

A structure of a robot includes: a first member having a hollow portion in the vicinity of a horizontal axis; a second member rotatably supported on a side surface of the first member and having a hollow portion in the vicinity of the horizontal axis; a drive motor producing power for rotating the second member; and a speed reducer reducing the rotation speed of the drive motor and transmitting the rotation to the second member. The speed reducer includes: an output hypoid gear formed of a ring gear disposed coaxially with the horizontal axis and fixed to the first member; an input hypoid gear engaged with the output hypoid gear; and a transmission mechanism transmitting rotation from the drive motor to the input hypoid gear while reducing the speed. The drive motor, the input hypoid gear, and the transmission mechanism are supported in the second member in an accommodated state.

7 Claims, 7 Drawing Sheets

(51) Int. Cl.
*F16H 1/14* (2006.01)
*B25J 18/00* (2006.01)

(56) References Cited

U.S. PATENT DOCUMENTS

| | | | | |
|---|---|---|---|---|
| 4,842,474 | A | | 6/1989 | Torii et al. |
| 4,864,888 | A | * | 9/1989 | Iwata .................... B25J 17/0241 74/640 |
| 4,904,148 | A | * | 2/1990 | Larsson ..................... B25J 9/04 414/680 |
| 5,007,784 | A | * | 4/1991 | Genov ..................... B25J 9/042 198/471.1 |
| 5,634,374 | A | * | 6/1997 | Depietri .................. F16H 1/203 74/417 |
| 6,250,174 | B1 | * | 6/2001 | Terada ..................... B25J 9/047 414/918 |
| 10,080,618 | B2 | * | 9/2018 | Marshall ................ A61B 34/30 |
| 10,335,944 | B2 | * | 7/2019 | Inoue .................. B25J 17/0283 |
| 10,398,516 | B2 | * | 9/2019 | Jackson ................. A61B 34/30 |
| 10,414,044 | B2 | * | 9/2019 | Motomura ............... B25J 9/102 |
| 2006/0156852 | A1 | * | 7/2006 | Haniya .................... B25J 9/102 74/490.03 |
| 2006/0170384 | A1 | * | 8/2006 | Kumagai ............. B25J 19/0004 318/568.11 |
| 2006/0179964 | A1 | * | 8/2006 | Hama .................. B25J 19/0029 74/490.05 |
| 2007/0022836 | A1 | | 2/2007 | Shigemi et al. |
| 2008/0056859 | A1 | * | 3/2008 | Inoue .................. B25J 19/0029 414/222.01 |
| 2009/0314120 | A1 | * | 12/2009 | Larsson ............... B25J 19/0029 74/490.02 |
| 2010/0162845 | A1 | | 7/2010 | Yonehara et al. |
| 2012/0266720 | A1 | * | 10/2012 | Oka ..................... B25J 17/0283 74/665 H |
| 2012/0312116 | A1 | | 12/2012 | Yonehara et al. |
| 2014/0137685 | A1 | * | 5/2014 | Iwayama ................ B25J 18/00 74/490.02 |
| 2014/0318298 | A1 | * | 10/2014 | Inoue ...................... B25J 17/02 74/490.03 |
| 2017/0282358 | A1 | * | 10/2017 | Inoue ...................... B25J 9/102 |
| 2017/0282382 | A1 | * | 10/2017 | Inoue ...................... B25J 9/102 |
| 2017/0291313 | A1 | * | 10/2017 | Inoue .................. B25J 19/0029 |
| 2018/0333844 | A1 | * | 11/2018 | Inoue ...................... B23K 9/12 |
| 2018/0372195 | A1 | * | 12/2018 | Yoon ..................... B25J 18/02 |
| 2019/0048975 | A1 | * | 2/2019 | Osaki ..................... F16H 1/145 |
| 2019/0305618 | A1 | * | 10/2019 | Mizukoshi ............... B25J 9/108 |
| 2020/0130173 | A1 | * | 4/2020 | Neubauer ................ B25J 9/104 |
| 2020/0206911 | A1 | * | 7/2020 | Fujioka ............... B25J 19/0029 |

FOREIGN PATENT DOCUMENTS

| | | |
|---|---|---|
| EP | 02697749 A1 | 6/1988 |
| EP | 2213425 A1 | 8/2010 |
| JP | S59-187489 A | 10/1984 |
| JP | S60-180791 A | 9/1985 |
| JP | S61-056879 A | 3/1986 |
| JP | S62-277292 A | 12/1987 |
| JP | H02-205436 A | 8/1990 |
| JP | 2005-349510 A | 12/2005 |
| JP | 2008-073833 A | 4/2008 |
| JP | 2013-071200 A | 4/2013 |
| JP | 2014-213437 A | 11/2014 |
| JP | 5702826 B | 4/2015 |
| JP | 2017-013157 A | 1/2017 |
| JP | 2017-185573 A | 10/2017 |
| JP | 2017-185574 A | 10/2017 |
| JP | 2017-185597 A | 10/2017 |
| WO | 2009/069389 A1 | 6/2009 |
| WO | 2017/150319 A1 | 9/2017 |

OTHER PUBLICATIONS

Search Report dated Sep. 25, 2019, in corresponding Japanese Application No. 2017-226006; 22 pages.
Chinese Office Action dated Mar. 12, 2020, in connection with corresponding CN Application No. 201811374261.4 (10 pgs., including machine-generated English translation).

* cited by examiner

US 10,882,193 B2

ROBOT STRUCTURE

CROSS-REFERENCE TO RELATED APPLICATIONS

This application is based on Japanese Patent Application No. 2017-226006, the content of which is incorporated herein by reference.

FIELD

The present invention relates to a robot structure.

BACKGROUND

In the related art, as a robot structure provided with an arm that is rotated about a horizontal axis, there is a generally known robot structure in which a motor and a decelerator that are coaxially disposed on an axis connect a turning part and the arm or connect between the arm and another arm, and the arm is rotationally driven with respect to the turning part or another arm (for example, see PCT International Publication No. WO 2009/069389).

SUMMARY

The present invention provides the following solutions.

One aspect of the present invention provides a robot structure including: a first member that has a hollow portion in the vicinity of a horizontal axis; a second member that is supported on a side surface of the first member so as to be rotatable about the horizontal axis and that has a hollow portion in the vicinity of the horizontal axis; a drive motor that generates power for rotating the second member with respect to the first member; and a speed reducer that reduces the speed of rotation of the drive motor and that transmits the rotation to the second member, wherein the speed reducer is provided with: an output hypoid gear formed of a ring gear that is disposed coaxially with the horizontal axis and that is fixed to the first member; an input hypoid gear that is engaged with the output hypoid gear; and a transmission mechanism that transmits rotation from the drive motor to the input hypoid gear while reducing the speed of the rotation; and the drive motor, the input hypoid gear, and the transmission mechanism are supported in the second member in an accommodated state. (It is noted that the robot structure may, in different exemplary embodiments, be provided to join different parts of the robot, since different parts of the robot may be intended to be rotatable with respect to one another. For example, the robot structure may be provided so that it connects a turning part of the robot and an arm of the robot, and may also be provided so that it connects an arm to another arm of the robot. As such, a "first member" may refer generically to a first part joined by the robot structure, and a "second member" may refer generically to a second part joined by the robot structure. For example, in a first exemplary embodiment, the robot may be intended to rotate at a first location, between the turning part of the base and the first arm of the robot. In this first exemplary embodiment, a "first member" may be a turning part of the robot, which may be joined, by the robot structure, to a "second member," which may in this case be a first arm of the robot. In a second exemplary embodiment, the robot may be intended to rotate at a second location, between the first arm of the robot and the second arm of the robot. In this second exemplary embodiment, a "first member" may be a second arm of the robot, which may be joined, by the robot structure, to a "second member," which may in this case also be the first arm of the robot.)

DETAILED DESCRIPTION

The structure of a robot 1 according to one embodiment of the present invention will be described below with reference to the drawings.

Figure 1:
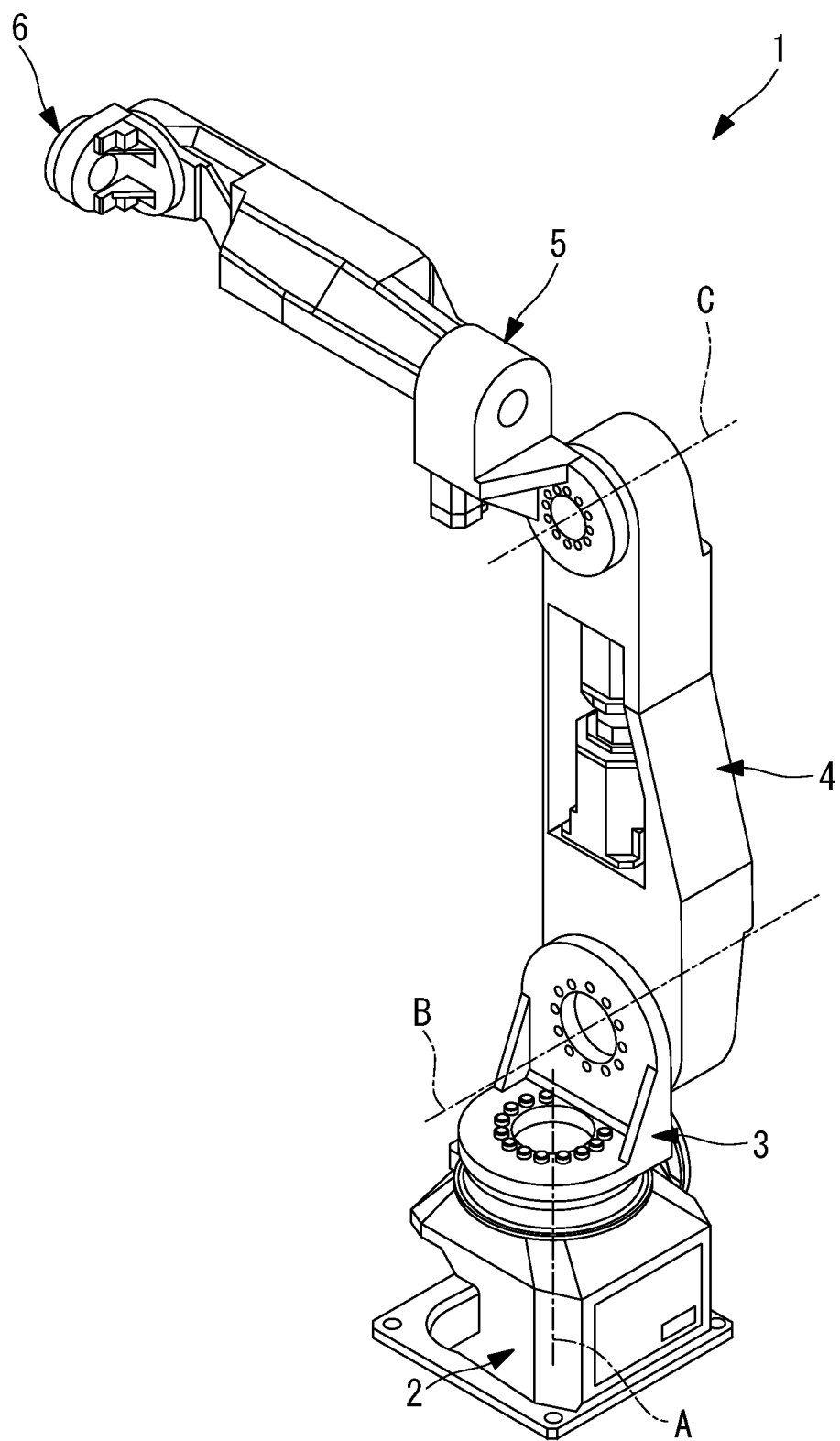
FIG. 1 is a perspective view of a robot that has a structure according to one embodiment of the present invention, seen from a left back side.
Figure 2:
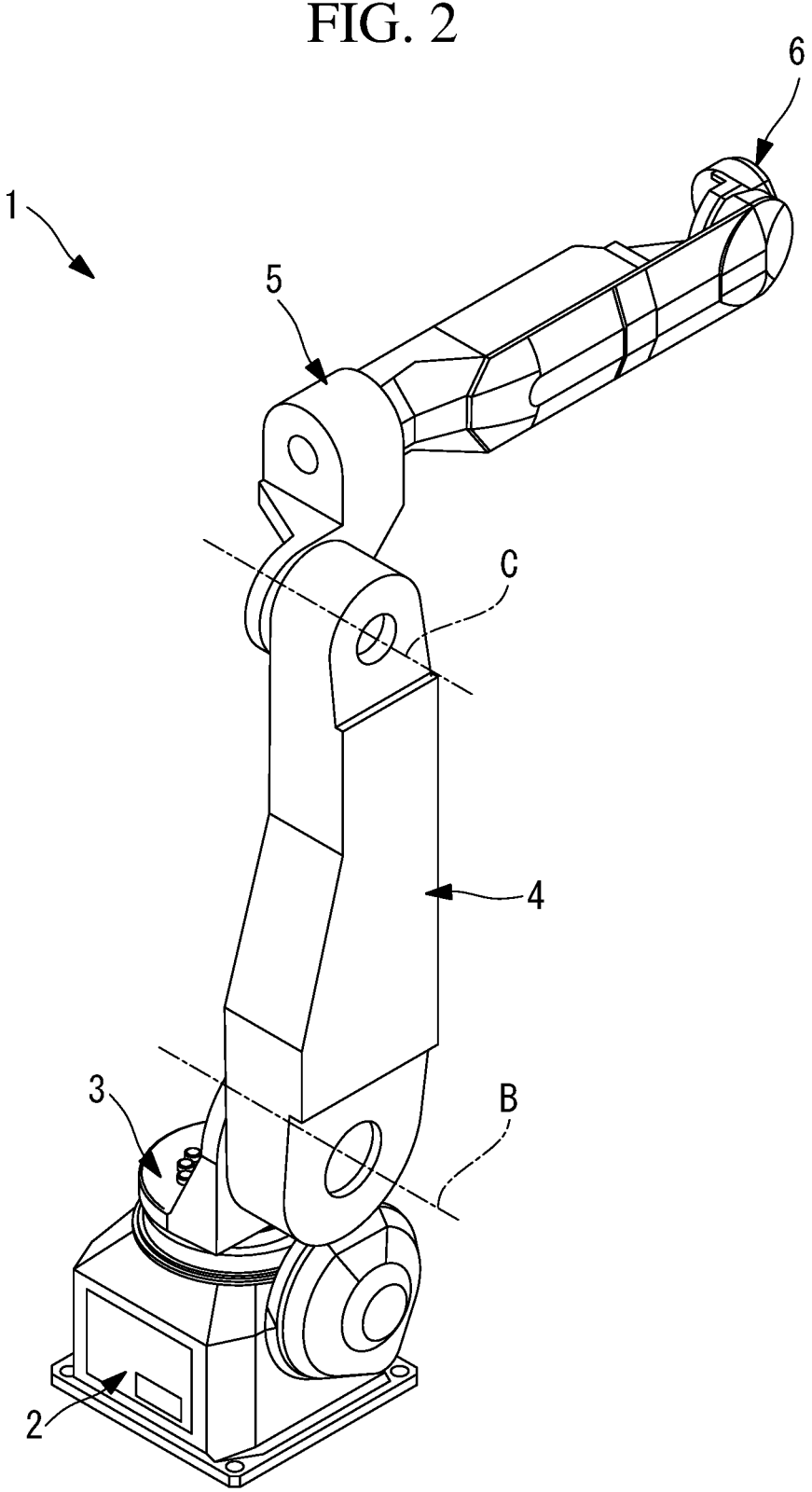
FIG. 2 is a perspective view of the robot shown in FIG. 1, seen from a right back side.
Figure 3:
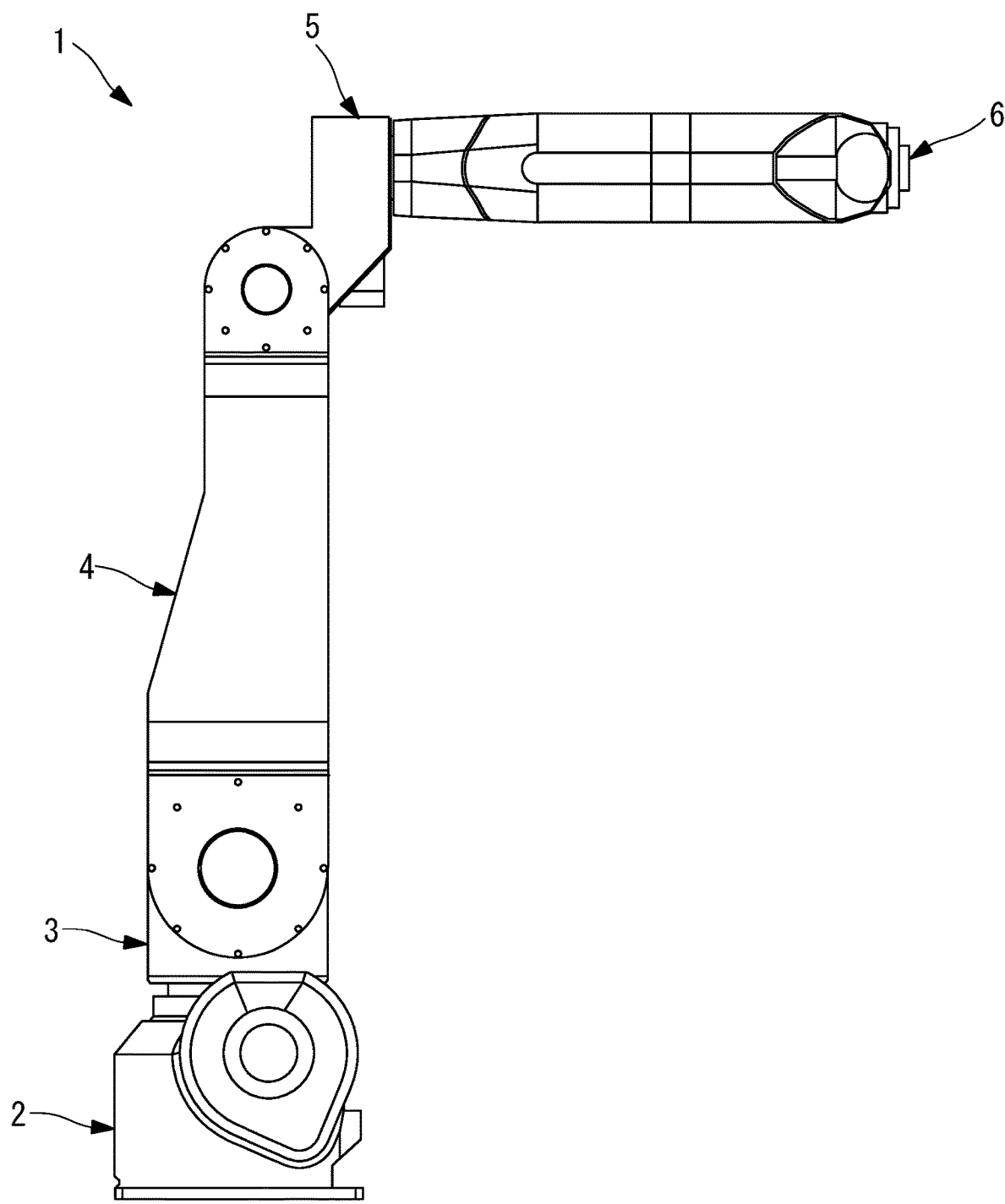
FIG. 3 is a side view of the robot shown in FIG. 1, seen from a right side.

As shown in FIGS. 1 to 3, the robot 1 having the structure according to this embodiment is a vertically articulated robot that is provided with: a base 2 that is installed on a floor surface (installation target surface); a turning part (first member) 3 that is supported so as to be rotatable about a vertical first axis (vertical axis) A with respect to the base 2; a first arm (second member) 4 that is supported so as to be pivotable about a horizontal second axis (horizontal axis, first axis) B with respect to the turning part 3; a second arm 5 that is supported at a distal end of the first arm 4 so as to be pivotable about a horizontal third axis (second axis) C; and a three-axis wrist unit 6 that is supported at a distal end of the second arm 5.

Figure 4:
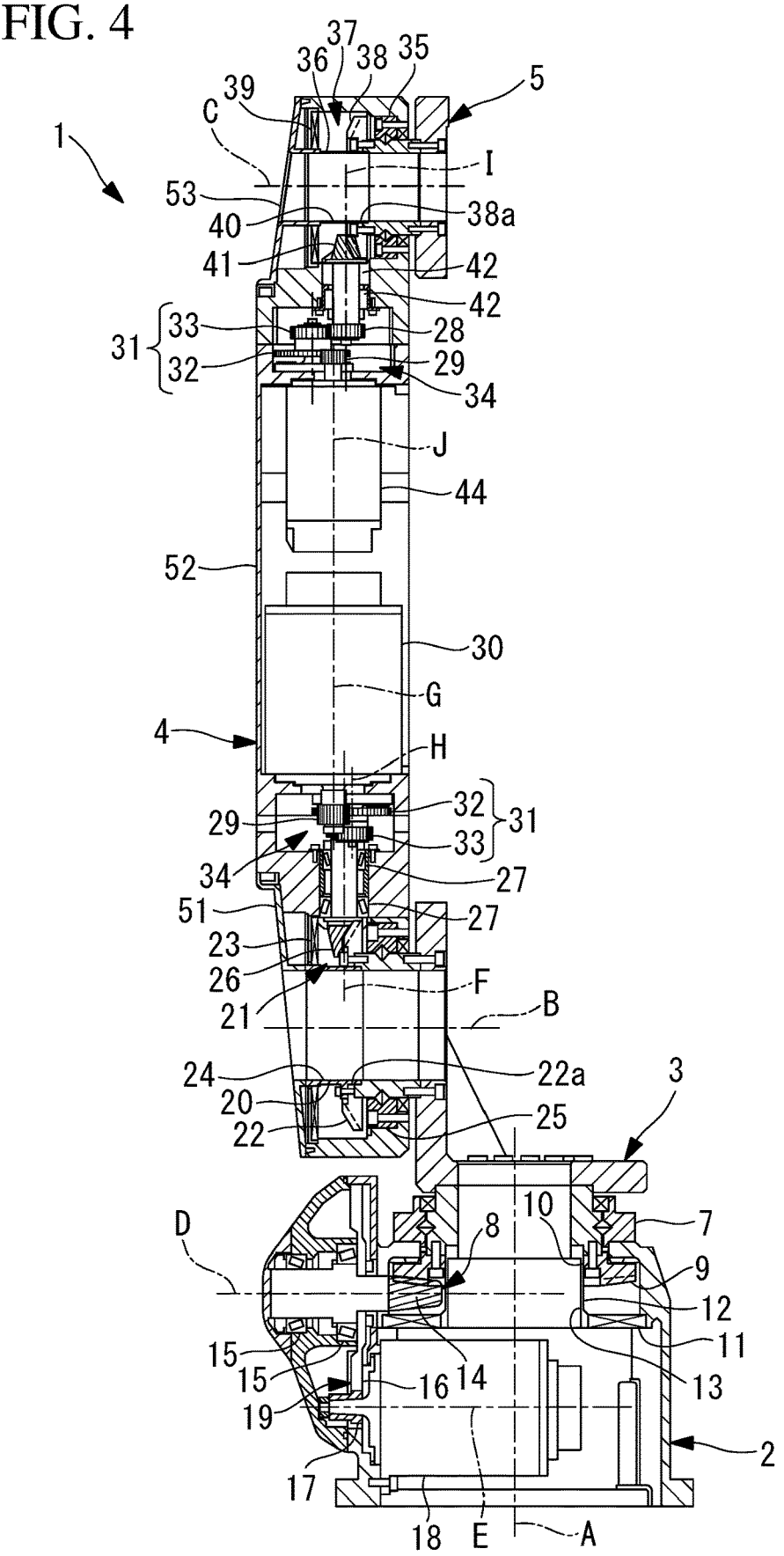
FIG. 4 is a longitudinal sectional view of the robot shown in FIG. 1, seen from a front side.

As shown in FIG. 4, the turning part 3 is supported on the top of the base 2 so as to be rotatable about the first axis A by means of a bearing 7. A ring gear (turning output hypoid gear) 9 that constitutes a first hypoid gear set (turning speed reducer) 8 is fixed at the bottom of the turning part 3. The ring gear 9 has a through-hole 10 provided at the center thereof, and a cylindrical member 12 that forms an oil box together with an oil seal 11 disposed between the inner surface of the base 2 and the ring gear 9 is fixed in the through-hole 10. The thickness of the cylindrical member 12 in the radial direction is set sufficiently small, and the cylindrical member 12 has, therein, an inner hole (hollow portion) 13 having a sufficient diameter.

The first hypoid gear set 8 is provided with a pinion gear (turning input hypoid gear) 14 and the ring gear 9, which are engaged with each other in the oil box. The pinion gear 14 is supported at a side section of the base 2 so as to be rotatable about a horizontal axis D by means of bearings 15. A large gear 16 that is formed of a spur gear is fixed to the pinion gear 14. Furthermore, a drive motor (turning motor) 18 for turning the turning part 3 is disposed inside the base 2 such that an axis E of the shaft thereof is made parallel to the axis D of the pinion gear 14. A small gear 17 that is formed of a spur gear to be engaged with the large gear 16 is fixed to the shaft of the drive motor 18.

The speed of rotation of the drive motor 18 is first reduced by a transmission mechanism (turning transmission mechanism) 19 that is formed of the small gear 17 and the large gear 16 and is again reduced by the engagement of the pinion gear 14 and the ring gear 9, and the rotation is transmitted to the turning part 3. The engagement in the first hypoid gear set 8 and the engagement of the small gear 17 and the large gear 16 are each sufficiently lubricated in the oil box.

The drive motor 18 for turning the turning part 3 is disposed at a position horizontally shifted with respect to the inner hole 13, which is provided along the first axis A. Accordingly, a large-traverse-section path that vertically penetrates, in the vicinity of the first axis A, from the inside of the base 2 toward an upper section of the turning part 3 is formed.

Figure 5:
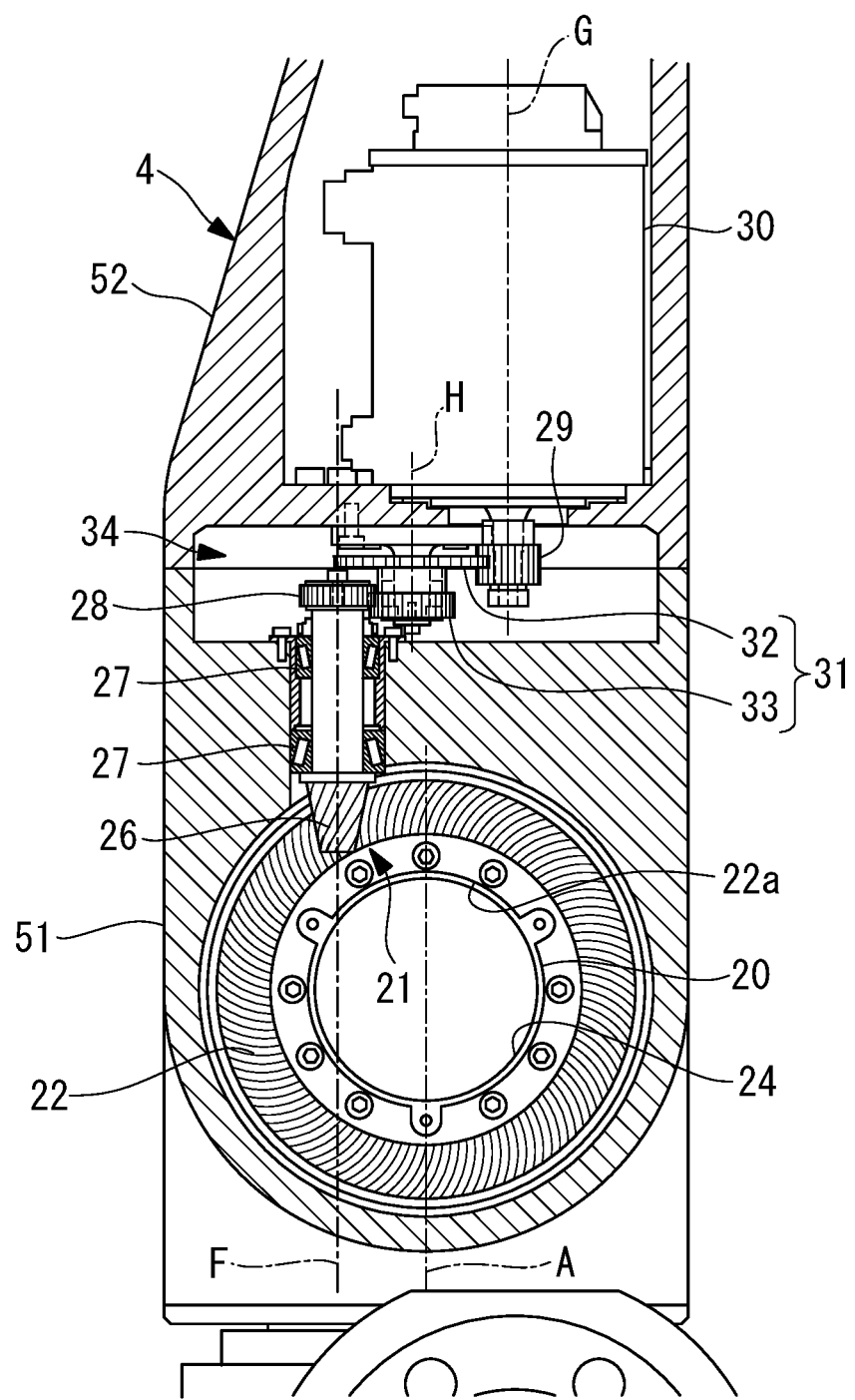
FIG. 5 is a longitudinal sectional view of a partial section of the robot shown in FIG. 1 around a second axis, seen from a right side.

As shown in FIGS. 4 and 5, the first arm 4 is supported on the top of the turning part 3 so as to be rotatable about the second axis B by means of a bearing 25. A cylindrical member 20 that is disposed coaxially with the second axis B is fixed to the turning part 3, and a ring gear (output hypoid gear) 22 that constitutes a second hypoid gear set (speed reducer) 21 is fixed at an intermediate position of the cylindrical member 20 in the longitudinal direction.

The ring gear 22 has a through-hole 22a provided at the center thereof, and the cylindrical member 20, which forms an oil box together with an oil seal 23 disposed between the inner surface of the first arm 4 and the ring gear 22, is fixed in the through-hole 22a. The thickness of the cylindrical member 20 in the radial direction is set sufficiently small, and the cylindrical member 20 has, therein, an inner hole (hollow portion) 24 having a sufficient diameter. Accordingly, a large-traverse-section path that horizontally penetrates in the vicinity of the second axis B is formed in the turning part 3 and the first arm 4.

The second hypoid gear set 21 is provided with a pinion gear (input hypoid gear) 26 and the ring gear 22, which are engaged with each other in the oil box. The pinion gear 26 is supported in the first arm 4 so as to be rotatable about an axis F that extends along a plane perpendicular to the second axis B and along the longitudinal direction of the first arm 4, by means of bearings 27. A gear (large gear) 28 that is formed of a spur gear is fixed to the pinion gear 26.

Furthermore, a drive motor 30 for rotating the first arm 4 is disposed inside the first arm 4 such that an axis G of the shaft thereof is made parallel to the axis F of the pinion gear 26. A gear (small gear) 29 that is formed of a spur gear is fixed to the shaft of the drive motor 30.

An intermediate gear 31 that is supported in the first arm 4 so as to be rotatable about an axis H that is parallel to the axis G of the shaft of the drive motor 30 and the axis F of the pinion gear 26 is disposed between the gear 29, which is fixed to the shaft of the drive motor 30, and the gear 28, which is fixed to the pinion gear 26. The intermediate gear 31 is provided with a large gear 32 that is engaged with the gear 29, which is fixed to the shaft of the drive motor 30, and a small gear 33 that is engaged with the gear 28, which is fixed to the pinion gear 26, such that the large gear 32 and the small gear 33 are disposed coaxially. The two pairs of the gears 28, 33 and the gears 29, 32 constitute a transmission mechanism 34 that transmits rotation of the drive motor 30 to the pinion gear 26 while reducing the speed thereof.

The speed of rotation of the drive motor 30 is first reduced by the transmission mechanism 34 and is again reduced by the engagement of the pinion gear 26 and the ring gear 22, and the rotation is transmitted to the first arm 4. The engagement in the second hypoid gear set 21 and the engagement in the transmission mechanism 34 are each sufficiently lubricated in the oil box.

As shown in FIG. 4, the second arm 5 is supported on the top of the first arm 4 so as to be rotatable about the third axis C with respect to the first arm 4 by means of a bearing 35. A cylindrical member 36 that is disposed coaxially with the third axis C is fixed to the second arm 5, and a ring gear (output hypoid gear) 38 that constitutes a third hypoid gear set (speed reducer) 37 is fixed at an intermediate position of the cylindrical member 36 in the longitudinal direction.

The ring gear 38 has a through-hole 38a provided at the center thereof, and the cylindrical member 36, which forms an oil box together with an oil seal 39 disposed between the inner surface of the first arm 4 and the ring gear 38, is fixed in the through-hole 38a. The thickness of the cylindrical member 36 in the radial direction is set sufficiently small, and the cylindrical member 36 has, therein, an inner hole (hollow portion) 40 having a sufficient diameter. Accordingly, a large-traverse-section path that horizontally penetrates in the vicinity of the third axis C is formed in first arm 4 and the second arm 5.

The third hypoid gear set 37 is provided with a pinion gear (input hypoid gear) 41 and the ring gear 38, which are engaged with each other in the oil box. The pinion gear 41 is supported in the first arm 4 so as to be rotatable about an axis I that extends along a plane perpendicular to the third axis C and along the longitudinal direction of the first arm 4, by means of bearings 42. The structure of a transmission mechanism is the same as the above-described transmission mechanism 34.

Furthermore, a drive motor 44 for rotating the second arm 5 is disposed inside the first arm 4 such that an axis J of the shaft of the drive motor 44 is made parallel to the axis I of the pinion gear 41. The speed of rotation of the drive motor 44 is first reduced by the transmission mechanism 34 and is again reduced by the engagement of the pinion gear 41 and the ring gear 38, and the rotation is transmitted to the second arm 5. The engagement in the third hypoid gear set 37 and the engagement in the transmission mechanism 34 are each sufficiently lubricated in the oil box.

As shown in FIG. 4, the first arm 4 is divided into three sections at two locations in the longitudinal direction and is constituted of, in order from the second axis B, a first arm section 51, a second arm section 52, and a third arm section 53 that are detachable from each other.

A dividing plane between the first arm section 51 and the second arm section 52 and a dividing plane between the second arm section 52 and the third arm section 53 are disposed at positions at each of which the oil box, which accommodates the corresponding transmission mechanism 34, is divided into two sections in the longitudinal-axis direction.

Specifically, the first arm section 51 of the first arm 4 is supported on the turning part 3 so as to be rotatable about the second axis B by means of the bearing 25 and supports the pinion gear 26 and the gear 28, which is fixed to the pinion gear 26, in a rotatable manner by means of the bearings 27.

In the second arm section 52, the drive motor 30, which drives the first arm 4, and the drive motor 44, which drives the second arm 5, are fixed, and each of the intermediate gears 31 is rotatably supported in a state in which the gear 29 fixed to the shaft of the drive motor 30, 44 is engaged with the corresponding gear 28.

Accordingly, in order to connect the second arm section 52 to the first arm section 51, the connection is performed while adjusting the engagement such that the small gear 33 of the intermediate gear 31 that is attached to the second arm section 52 is appropriately engaged with the gear 28 of the pinion gear 26 attached to the first arm section 51.

Furthermore, in order to connect the third arm section 53 to the second arm section 52, the connection is performed while adjusting the engagement such that the small gear 33 of the intermediate gear 31 that is attached to the second arm section 52 is appropriately engaged with the gear 28 of the pinion gear 41, which is attached to the third arm section 53.

When the second arm section 52 is connected to the first arm section 51, the oil box for accommodating the transmission mechanism 34 is formed therebetween in a sealed state. Furthermore, when the third arm section 53 is connected to the second arm section 52, the oil box for accommodating the transmission mechanism 34 is formed therebetween in a sealed state.

The operation of the structure of the thus-configured robot 1 of this embodiment will be described below.

According to the structure of the robot 1 of this embodiment, when the turning part 3 is rotated with respect to the base 2, rotation of the drive motor 18 is transmitted to the turning part 3 while the speed thereof is reduced in two stages by means of the transmission mechanism 19, which is formed of the small gear 17 and the large gear 16, and the first hypoid gear set 8, which is formed of the pinion gear 14 and the ring gear 9. Accordingly, the turning part 3 can be rotated about the vertical first axis A at high torque with respect to the base 2.

Furthermore, when the first arm 4 is rotated with respect to the turning part 3, rotation of the drive motor 30, which is accommodated in the first arm 4, is transmitted to the turning part 3 while the speed thereof is reduced in two stages by means of the transmission mechanism 34 and the second hypoid gear set 21. Accordingly, the first arm 4 can be rotated about the horizontal second axis B at high torque with respect to the turning part 3.

Furthermore, when the second arm 5 is rotated with respect to the first arm 4, rotation of the drive motor 44, which is accommodated in the first arm 4, is transmitted to the second arm 5 while the speed thereof is reduced in two stages by means of the transmission mechanism 34 and the third hypoid gear set 37. Accordingly, the second arm 5 can be rotated about the horizontal third axis C at high torque with respect to the first arm 4.

In the transmission mechanism 19, 34, the speed of rotation is reduced by the engagement of at least one corresponding pair of the gears 17, 29, 33, 16, 28, 32, which are formed of spur gears; thus, there is an advantage in that adjustment of the engagement is easy, and it is possible to prevent the occurrence of axial forces in the axial directions of the shaft of the drive motor 18, 30, 44 and the pinion gear 14, 26, 41.

Figure 6:
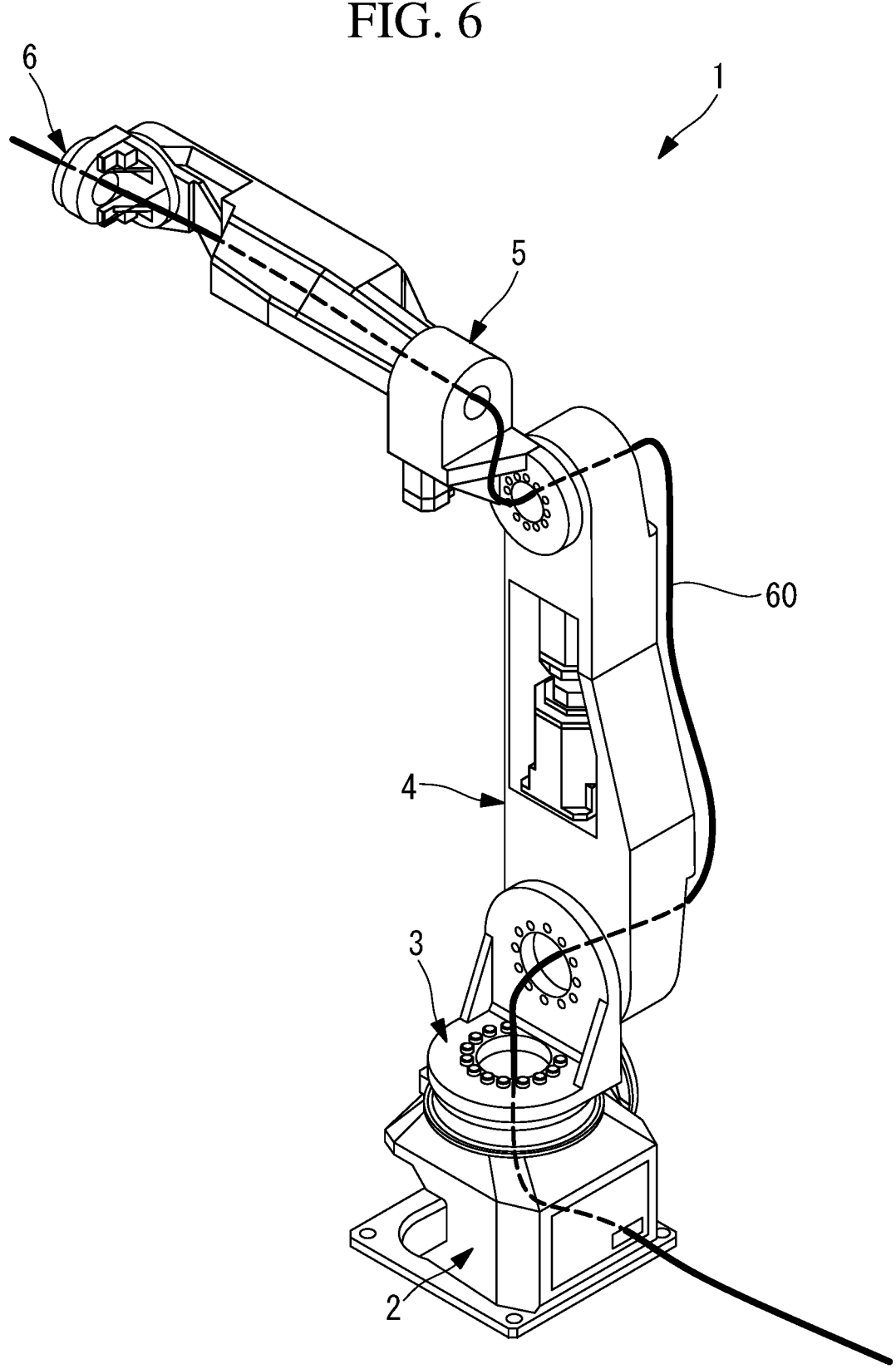
FIG. 6 is a perspective view showing a state in which a wire-shaped body is wired in the robot shown in FIG. 1, seen from a left back side.
Figure 7:
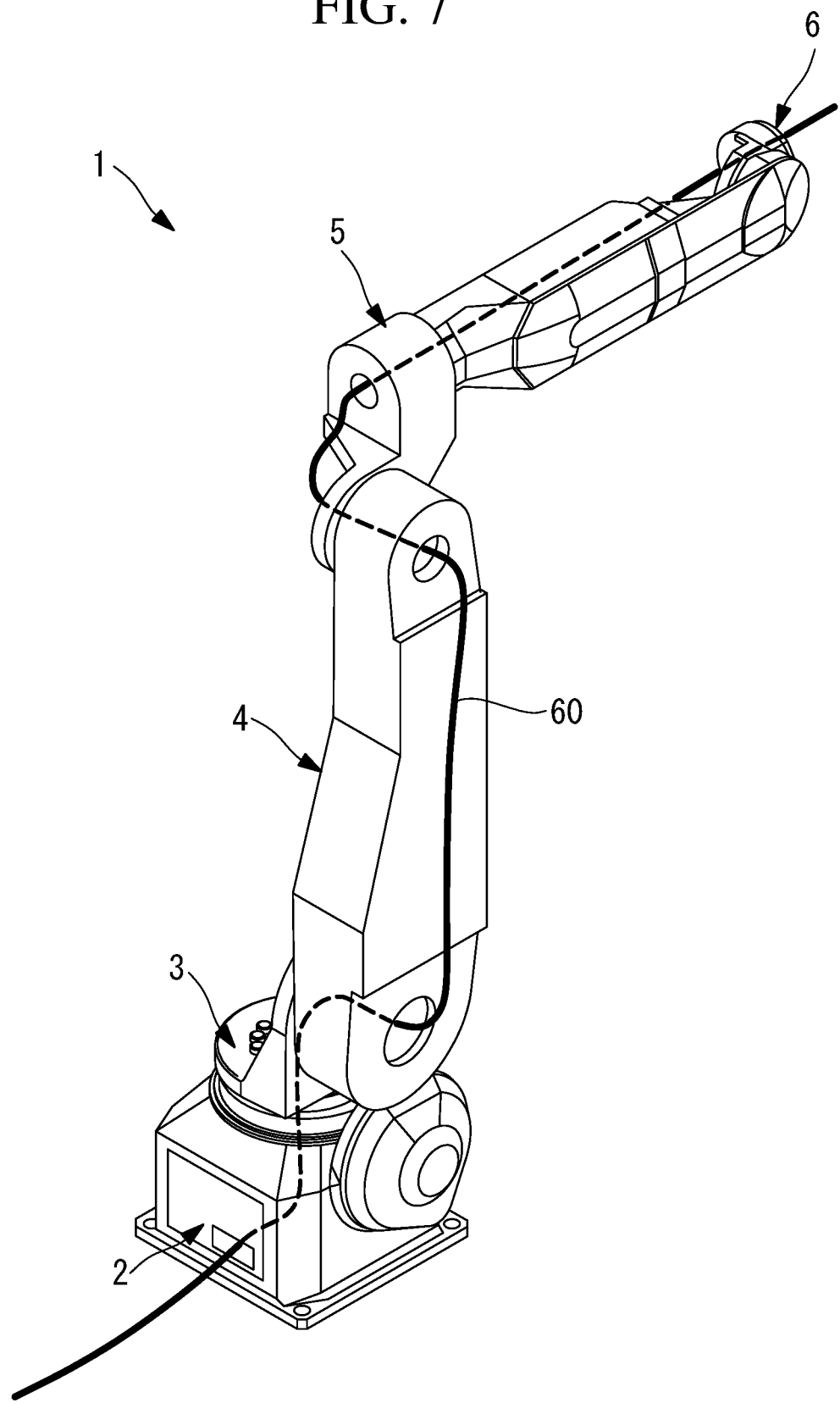
FIG. 7 is a perspective view of the robot shown in FIG. 6, seen from a right back side.

FIGS. 6 and 7 show states in which a wire-shaped body 60 guided from the base 2 up to the distal end of the wrist unit 6 is incorporated. Although support members for supporting the wire-shaped body 60 are not shown in the figures, minimal support members may be disposed in the right places to support the wire-shaped body 60.

According to the structure of the robot 1 of this embodiment, wiring of the wire-shaped body 60 from the base 2 to the turning part 3, from the turning part 3 to the first arm 4, and from the first arm 4 to the second arm 5 is performed via the large-traverse-section paths, which are formed in the vicinities of the first axis A, the second axis B, and the third axis C by adopting the hypoid gear sets 8, 21, and 37.

Specifically, according to the structure of the robot 1 of this embodiment, it is possible to wire the wire-shaped body 60 along the rotation axes A, B, and C in the vicinities of the centers of the rotation axes and to minimize deformation of the wire-shaped body 60 due to the rotational motions. Since large traverse sections are ensured as paths for the wire-shaped body 60, it is possible to easily wire a plurality of relatively thick wire-shaped bodies 60, such as a control cable, a gas hose, a wire conduit, and a feeding cable, for example.

In particular, at a section where the wire-shaped body 60 is wired from the base 2 to the first arm 4 and a section where the wire-shaped body 60 is wired from the first arm 4 to the second arm 5, deformation of the wire-shaped body 60 due to the rotational motion of the first arm 4 with respect to the base 2 and the rotational motion of the second arm 5 with respect to the first arm 4 can be minimized, thus making it unnecessary to provide a long extra length. Therefore, there is an advantage in that a compact configuration can be achieved by minimizing the spaces occupied by an extra part of the wire-shaped body 60 in the vicinities of the joint axes, and ramping of the wire-shaped body 60 due to the rotational motion of the first arm 4 or the second arm 5 can be suppressed.

Furthermore, since the speeds of driving for the turning part 3 with respect to the base 2, the first arm 4 with respect to the turning part 3, and the second arm 5 with respect to the first arm 4 are reduced by at least one corresponding pair of the spur gear pairs 16, 17, 28, 29, 32, and 33 and by the corresponding hypoid gear sets 8, 21, and 37, there is an advantage in that general-purpose drive motors can be used instead of special hollow motors.

Furthermore, in a case in which hollow motors or hollow decelerators are used, if a large-traverse-section hollow portion is formed in the vicinity of the second axis B, there is a disadvantage in that the external dimensions of the first arm 4 around the second axis B are also increased. In contrast to this, as in the structure of the robot 1 of this embodiment, combinations of the spur gear pairs 16, 17, 28, 29, 32, and 33 and the hypoid gear sets 8, 21, and 37 are used, thereby making it possible to sufficiently reduce the external dimensions of the first arm 4 around the second axis B while forming a large-traverse-section hollow portion in the vicinity of the second axis B.

Accordingly, the height position of the second axis B can be sufficiently lowered while avoiding interference between the first arm 4 and the base 2.

Specifically, there is an advantage in that the overall height of the robot 1 can be suppressed by suppressing the height of the second axis B, and the robot 1 can be easily installed in an environment where an obstacle is close above the robot 1.

Furthermore, in the structure of the robot 1 of this embodiment, since the drive motors 30 and 44, which drive the first arm 4 and the second arm 5, are fixed in the first arm 4, there is an advantage in that the space in the first arm 4, which is formed to be hollow, is effectively used, thus making it possible to realize a compact robot 1, from which the drive motors 30 and 44 do not project to the outside.

Note that, in this embodiment, although the same structures are adopted in the space between the base 2 and the turning part 3, in the space between the turning part 3 and the first arm 4, and in the space between the first arm 4 and the second arm 5, the present invention is not limited thereto, and, as the structure of the robot 1 according to the present invention, it is also possible to adopt the above-described structure only in the space between the turning part 3 and the first arm 4 and to adopt known drive mechanisms in the space between the base 2 and the turning part 3 and in the space between the first arm 4 and the second arm 5.

Furthermore, it is also possible to adopt the above-described structure only in the space between the turning part 3 and the first arm 4 and in the space between the first arm 4 and the second arm 5 and to adopt a known drive mechanism in the space between the base 2 and the turning part 3.

Furthermore, although FIGS. 6 and 7 show an example line of a wire-shaped body 60 guided from the base 2 to the wrist unit 6, instead of this, the wire-shaped body 60 may be relayed in the middle. Furthermore, power cables and control cables for the respective drive motors 18, 30, and 44 for driving the turning part 3, the first arm 4, the second arm 5, and the wrist unit 6 may be wired together with the wire-shaped body 60, may branch off therefrom in the middle, and may be connected to the respective drive motors 18, 30, and 44.

As a result, the above-described embodiment leads to the following aspect.

The present invention provides the following solutions.

One aspect of the present invention provides a robot structure including: a first member that has a hollow portion in the vicinity of a horizontal axis; a second member that is supported on a side surface of the first member so as to be rotatable about the horizontal axis and that has a hollow portion in the vicinity of the horizontal axis; a drive motor that generates power for rotating the second member with respect to the first member; and a speed reducer that reduces the speed of rotation of the drive motor and that transmits the rotation to the second member, wherein the speed reducer is provided with: an output hypoid gear formed of a ring gear that is disposed coaxially with the horizontal axis and that is fixed to the first member; an input hypoid gear that is engaged with the output hypoid gear; and a transmission mechanism that transmits rotation from the drive motor to the input hypoid gear while reducing the speed of the rotation; and the drive motor, the input hypoid gear, and the transmission mechanism are supported in the second member in an accommodated state.

According to this aspect, when the drive motor is actuated, the transmission mechanism transmits rotation of the drive motor while reducing the speed thereof, thus rotating the input hypoid gear, and thus rotating the output hypoid gear, which is engaged with the input hypoid gear, about the horizontal axis. Since the output hypoid gear is fixed to the second member, power of the drive motor is transmitted to the second member, thus rotating the second member about the horizontal axis with respect to the first member.

Since rotation of the drive motor is transmitted to the first member while the speed thereof is reduced in two stages by means of the transmission mechanism and the engagement of the input hypoid gear and the output hypoid gear, the second member can be rotated with respect to the first member at high torque.

Since a path that penetrates from the first member to the second member is formed in the vicinity of the horizontal axis by means of the hollow portions of the first member and the second member and the central hole of the output hypoid gear, which is formed of the ring gear fixed to the first member, it is possible to perform routing of the wire-shaped body that is less affected by rotation of the second member, by using this path.

In the above-described aspect, the transmission mechanism may be provided with: a small gear that is fixed to a shaft of the drive motor; and a large gear that is engaged with the small gear.

By doing so, the speed of rotation of the drive motor can be easily reduced by the engagement of the small gear and the large gear.

Furthermore, in the above-described aspect, the large gear and the small gear may be spur gears.

By doing so, since an axial force does not occur in the engagement of the large gear and the small gear, an axial force is prevented from acting on the shaft of the drive motor.

Furthermore, in the above-described aspect, the second member may be provided with a first arm section and a second arm section that are detachably connected in the longitudinal direction; the first arm section may be rotatably supported on the first member and may support the input hypoid gear so as to be rotatable about an axis extending in a plane perpendicular to the horizontal axis and in a direction along a longitudinal axis of the second member; the second arm section may support the drive motor; and, when the first arm section and the second arm section are connected, the transmission mechanism may be connected so as to transmit rotation of the drive motor to the input hypoid gear.

By doing so, in a state in which the first arm section and the second arm section are separated, it is possible to rotatably support the first arm section on the first member and to adjust engagement of the input hypoid gear, which is supported in the first arm section, and the output hypoid gear, which is fixed to the first member. Thereafter, when the second arm section, in which the drive motor is supported, is connected to the first arm section, the transmission mechanism is connected, thus transmitting rotation of the drive motor to the input hypoid gear. Accordingly, the assembly work can be facilitated.

Furthermore, in the above-described aspect, the first member may be a turning part that is supported, so as to be rotatable about a vertical axis, on the top of a base fixed to an installation target surface; and the second member may be a first arm that is rotatably supported on the turning part. (In such a configuration where the robot structure joins the first arm and the turning part, the first member may be the turning part 3, and the second member may be the first arm 4.)

By doing so, the wire-shaped body extending from the turning part to the first arm can be wired through the hollow portion in the vicinity of the horizontal axis, about which the first arm is rotated. Accordingly, since the wire-shaped body is maintained in the vicinity of the horizontal axis even when the first arm is rotated, it is possible to prevent an excessive load from being imposed on the wire-shaped body even if a long extra length is not provided and to perform routing so as to prevent the wire-shaped body from ramping even when the first arm is rotated at high speed.

Furthermore, the above-described aspect may further includes: a first arm that is supported, so as to be rotatable about a horizontal first axis, on a turning part that is supported, so as to be rotatable about a vertical axis, on the top of a base fixed to an installation target surface; and a second arm that is supported, so as to be rotatable about a horizontal second axis, at a distal end of the first arm, wherein the first member may be the second arm; and the second member may be the first arm. (In such a configuration where the robot structure joins the first arm and the second arm, the first member may be the second arm 5, and the second member may be the first arm 4.)

By doing so, when the drive motor is actuated, the transmission mechanism transmits rotation of the drive motor while reducing the speed thereof, thus rotating the input hypoid gear, and thus rotating the output hypoid gear, which is engaged with the input hypoid gear, about the horizontal axis. Since the output hypoid gear is fixed to the first arm, the power of the drive motor is transmitted to the first arm, and the second arm is rotated about the horizontal axis with respect to the first arm.

Since rotation of the drive motor is transmitted to the second arm while the speed thereof is reduced in two stages by means of the transmission mechanism and the engagement of the input hypoid gear and the output hypoid gear, the second arm can be rotated at high torque with respect to the first arm.

Since a path that penetrates from the first arm to the second arm is formed in the vicinity of the horizontal axis by means of the hollow portions of the first arm and the second arm and the central hole of the output hypoid gear, which is formed of the ring gear fixed to the second arm, it is possible to perform routing of the wire-shaped body that is less affected by relative rotation of the first arm and the second arm, by using this path.

Furthermore, in the above-described aspect, a base that is fixed to an installation target surface may be provided; the first member may be supported, so as to be rotatable about a vertical axis, on the top of the base; a turning motor that produces power for rotating the first member may be provided; a turning speed reducer that reduces the speed of rotation of the turning motor and that transmits the rotation to the first member may be provided; the turning speed reducer may be provided with a turning output hypoid gear that is formed of a ring gear fixed to the first member, a turning input hypoid gear that is engaged with the turning output hypoid gear, and a turning transmission mechanism that transmits rotation from the turning motor to the turning input hypoid gear while reducing the speed of the rotation; and the turning motor may be disposed at a lower position of the first member, the position being horizontally shifted from vertically below the hollow portion, and may be fixed to the base.

By doing so, when the turning motor is actuated, rotation of the drive motor is transmitted while the speed thereof is reduced by the turning transmission mechanism, thus rotating the turning input hypoid gear, and thus rotating the output hypoid gear, which is engaged with the turning input hypoid gear, about the vertical axis. Since the turning output hypoid gear is fixed to the first member, the power of the drive motor is transmitted to the first member, thus rotating the first member about the vertical axis with respect to the base.

Since rotation of the drive motor is transmitted to the first member while the speed thereof is reduced in two stages by means of the turning transmission mechanism and the engagement of the turning input hypoid gear and the turning output hypoid gear, the first member can be rotated at high torque.

Since a path that penetrates from the interior of the base to the upper side of the first member is formed by means of the central hole of the output hypoid gear, which is formed of the ring gear fixed to the first member, it is possible to perform routing of the wire-shaped body that is less affected by rotation of the first member, by using this path.

In this case, since the drive motor is disposed below the first member, the space for routing the wire-shaped body taken out upward through the above-described path can be prevented from being occupied by the drive motor, and comfortable routing can be performed. Accordingly, even when the first member is rotated at high speed with respect to the base, the wire-shaped body is prevented from ramping, and wiring from the base to a mechanical section or a peripheral device above the first member can be easily performed.

According to the present invention, an advantageous effect is afforded in that it is possible to perform wiring of a wire-shaped body to an arm while easily suppressing a positional change of the wire-shaped body caused by an arm operation.

REFERENCE SIGNS LIST 1 robot
2 base
3 turning part (first member)
4 first arm (first member, second member)
5 second arm (second member)
8 first hypoid gear set (turning speed reducer)
9 ring gear (turning output hypoid gear)
13, 24, 40 inner hole (hollow portion)
14 pinion gear (turning input hypoid gear)
18 drive motor (turning motor)
19 transmission mechanism (turning transmission mechanism)
21 second hypoid gear set (speed reducer)
22, 38 ring gear (output hypoid gear)
26, 41 pinion gear (input hypoid gear)
28 gear (large gear, spur gear)
29 gear (small gear, spur gear)
32 large gear (spur gear)
33 small gear (spur gear)
30, 44 drive motor
34 transmission mechanism
37 third hypoid gear set (speed reducer)
51 first arm section
52 second arm section
F axis
A first axis (vertical axis)
B second axis (first axis, horizontal axis)
C third axis (second axis)
D horizontal axis

The invention claimed is:
1. A robot structure comprising:
a first member that has a cylindrical hollow portion in a vicinity of a horizontal axis, said circular hollow portion having a predetermined diameter and extending from a first side of the first member to an opposite side of the first member;
a second member, the second member comprising a part separate from the first member that is coupled to and supported on a side surface of the first member so as to be rotatable, via a coupling to the first member, about the horizontal axis and that has a second cylindrical hollow portion in the vicinity of the horizontal axis, said second cylindrical hollow portion having the predetermined diameter and extending from a first side of the second member to an opposite side of the second member, said second cylindrical hollow portion interfacing with the cylindrical hollow portion;
a drive motor that generates power for rotating the second member with respect to the first member; and
a speed reducer that reduces the speed of rotation of the drive motor and that transmits rotation to the second member,
wherein the speed reducer comprises an output hypoid gear formed of a ring gear that is disposed coaxially with the horizontal axis and that is fixed to the first member; an input hypoid gear that is engaged with the output hypoid gear; and a transmission mechanism that transmits rotation from the drive motor to the input hypoid gear while reducing the speed of the rotation; and the drive motor, the input hypoid gear, and the transmission mechanism are supported in the second member in an accommodated state.

2. The robot structure according to claim 1, wherein the transmission mechanism comprises a small gear that is fixed to a shaft of the drive motor; and a large gear that is engaged with the small gear.

3. The robot structure according to claim 2, wherein the large gear and the small gear are spur gears.

4. The robot structure according to claim 1,
wherein the second member is provided with a first arm section and a second arm section that are detachably connected in a longitudinal direction;
the first arm section is rotatably supported on the first member and supports the input hypoid gear so as to be rotatable about an axis extending in a plane perpendicular to the horizontal axis and in a direction along a longitudinal axis of the second member;
the second arm section supports the drive motor; and
when the first arm section and the second arm section are connected, the transmission mechanism is connected so as to transmit rotation of the drive motor to the input hypoid gear.

5. The robot structure according to claim 1,
wherein the first member is a turning part that is supported, so as to be rotatable about a vertical axis, on a top of a base fixed to an installation target surface; and
the second member is a first arm that is rotatably supported on the turning part.

6. The robot structure according to claim 1, further comprising:
a first arm that is supported, so as to be rotatable about a horizontal first axis, on a turning part that is supported, so as to be rotatable about a vertical axis, on a top of a base fixed to an installation target surface; and
a second arm that is supported, so as to be rotatable about a horizontal second axis, at a distal end of the first arm, wherein the first member is the second arm; and
the second member is the first arm.

7. The robot structure according to claim 1,
wherein a base that is fixed to an installation target surface is provided;
the first member is supported, so as to be rotatable about a vertical axis, on a top of the base;
a turning motor that produces power for rotating the first member is provided;
a turning speed reducer that reduces speed of rotation of the turning motor and that transmits rotation to the first member is provided;
the turning speed reducer is provided with a turning output hypoid gear that is formed of a ring gear fixed to the first member, a turning input hypoid gear that is engaged with the turning output hypoid gear, and a turning transmission mechanism that transmits rotation from the turning motor to the turning input hypoid gear while reducing the speed of the rotation; and
the turning motor is disposed at a lower position of the first member, the position being horizontally shifted from vertically below the hollow portion and is fixed to the base.

* * * * *